W. WENDELL.
MACHINE FOR FORMING BRUSH HANDLES.
No. 170,320. Patented Nov. 23, 1875.
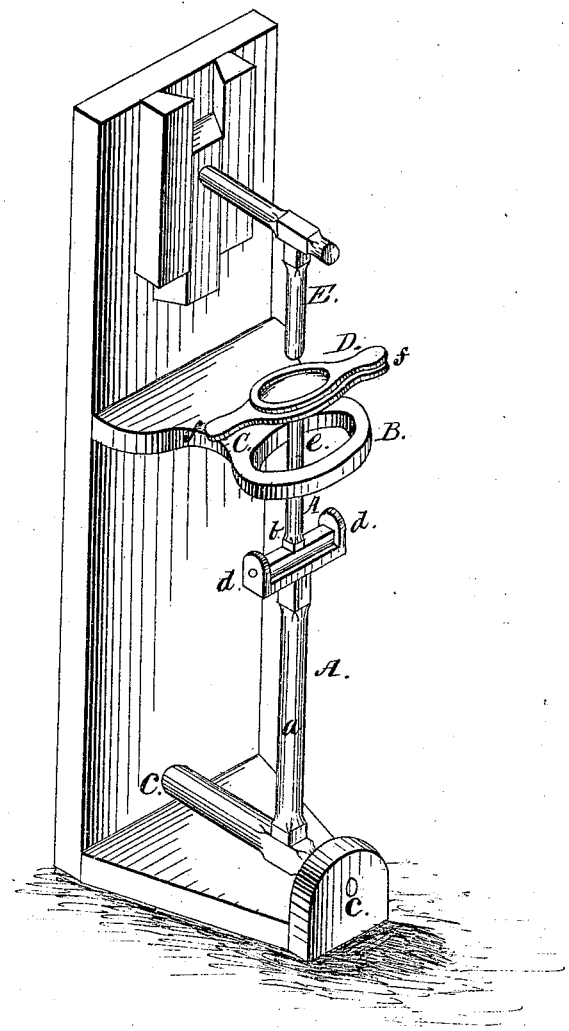
Witnesses:
Saml. S. Dexter
H. F. Dexter
Inventor:
Washington Wendell

UNITED STATES PATENT OFFICE.

WASHINGTON WENDELL, OF ORANGE, MASSACHUSETTS.

IMPROVEMENT IN MACHINES FOR FORMING BRUSH-HANDLES.

Specification forming part of Letters Patent No. 170,320, dated November 23, 1875; application filed August 16, 1875.

*To all whom it may concern:*

Be it known that I, WASHINGTON WENDELL, of Orange, State of Massachusetts, have invented an Improvement in Machines for Forming Brush-Handles, of which the following is a specification:

The object of my invention is to form on a brush-handle, or any other article where a similar surface is wanted, an oval crowning surface, with an elevation or flange at the edge; and consists of a device for carrying the brush-handle D under the revolving cutter E, in such a manner as to cut the required form, as shown in the accompanying drawing, in which A A represent an upright arm in two sections, *a* and *b*, the upper section *b* being surmounted by a platform, C, having two handles, *f f*, and the two sections *a* and *b* joined together at *d d* with a hinge-joint, and the arm secured to the frame-work of the machine at the lower end by the hinge-joint *c c*, set at right angles to the hinge at joint *d d*. The upper section *b* of the arm A A works within the hole *e* in the guiding-plate B.

The machine is operated in the following manner: The brush-handle D is laid on the top of the platform C, and secured with any ordinary fastening. The cutter and brush-handle are then brought as near together as is desired. The brush-handle is then carried about under the cutter by means of the handles *f f* of the platform C until the required surface is cut, the hole *e* in the guiding-plate B gaging the outer limits of the cut.

I claim as my invention—

The upright arm, hinged to the frame, and made in two parts, that are hinged together, the two hinges being placed at an angle to each other, so as to give a universal motion, in combination with a guiding-plate and a cutter, substantially as shown and described.

WASHINGTON WENDELL.

Witnesses:
 DAVIS GODDARD,
 MARY C. COOLIDGE.